(12) United States Patent
Akutsu

(10) Patent No.: US 12,560,260 B2
(45) Date of Patent: Feb. 24, 2026

(54) MULTILAYER TUBE

(71) Applicant: Junkosha Inc., Kasama (JP)

(72) Inventor: Ryo Akutsu, Kasama (JP)

(73) Assignee: JUNKOSHA, INC., Kasama (JP)

( * ) Notice: Subject to any disclaimer, the term of this patent is extended or adjusted under 35 U.S.C. 154(b) by 735 days.

(21) Appl. No.: 17/802,640

(22) PCT Filed: Feb. 22, 2021

(86) PCT No.: PCT/JP2021/006539
§ 371 (c)(1),
(2) Date: Feb. 17, 2023

(87) PCT Pub. No.: WO2021/172251
PCT Pub. Date: Sep. 2, 2021

(65) Prior Publication Data
US 2023/0323982 A1 Oct. 12, 2023

(30) Foreign Application Priority Data

Feb. 27, 2020 (JP) ................................. 2020-032484
Apr. 20, 2020 (JP) ................................. 2020-075058
(Continued)

(51) Int. Cl.
*F16L 11/04* (2006.01)
(52) U.S. Cl.
CPC .................................... *F16L 11/04* (2013.01)

(58) Field of Classification Search
CPC .. F16L 11/04; B32B 2250/02; B32B 2250/03; B32B 2250/246; B32B 1/08;
(Continued)

(56) References Cited

U.S. PATENT DOCUMENTS

2007/0260268 A1* 11/2007 Bartee ................... A61L 31/146
606/151

FOREIGN PATENT DOCUMENTS

| EP | 0605243 B1 | 1/1997 |
| JP | H071630 A | 1/1995 |

(Continued)

*Primary Examiner* — Michael C Miggins
(74) *Attorney, Agent, or Firm* — DUANE MORRIS LLP

(57) ABSTRACT

The present disclosure provides a multilayer tube which is flexible and exhibits excellent durability in terms of airtightness, while including as a main component, a polytetrafluoroethylene. The present disclosure is achieved by a multilayer tube which includes as a main component, a polytetrafluoroethylene, wherein if the total porosity (%) of the tube is plotted on the horizontal axis of a coordinate graph and the Martens hardness $HM_{3\ mN}$ of the tube as described below is plotted on the vertical axis, coordinate points representing characteristics of the multilayer tube are within a quadrangle that is bounded by four coordinate points, namely a (7.5, 0.25), b (8, 0.02), c (25, 0.38) and d (25, 0.03) on the graph. Meanwhile, $HM_{3\ mN}$ represents the Martens hardness at the time when the test force reaches 3 mN during the process of load application, with the maximum test force being set to 4 mN, if the inner surface of the tube is measured in accordance with ISO 14577.

12 Claims, 2 Drawing Sheets

(30)        Foreign Application Priority Data

Jul. 13, 2020    (JP) ................................ 2020-120206
Jul. 30, 2020    (JP) ................................ 2020-129751

(58)  Field of Classification Search
CPC ........ B32B 5/18; B32B 27/065; B32B 27/322;
                   B32B 2307/536; B32B 2597/00
See application file for complete search history.

(56)                References Cited

FOREIGN PATENT DOCUMENTS

| | | | |
|---|---|---|---|
| JP | H0872178 | A | 3/1996 |
| JP | 2012136020 | A | 7/2012 |
| JP | 2012153076 | A | 8/2012 |
| JP | 2018038783 | A | 3/2018 |

* cited by examiner

【FIG. 1】
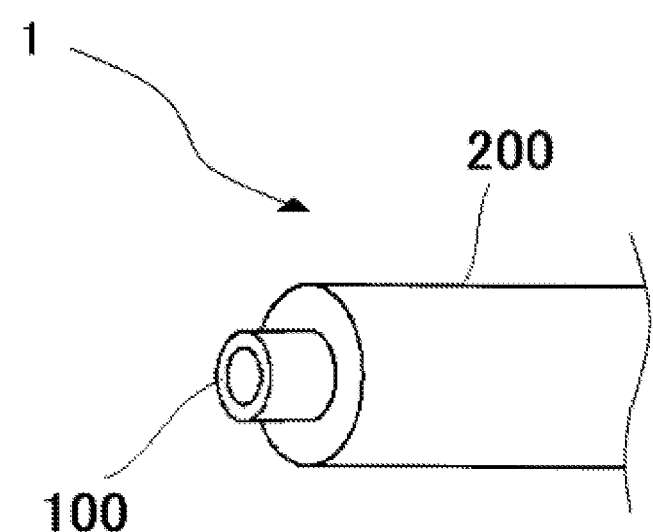
【FIG. 2】
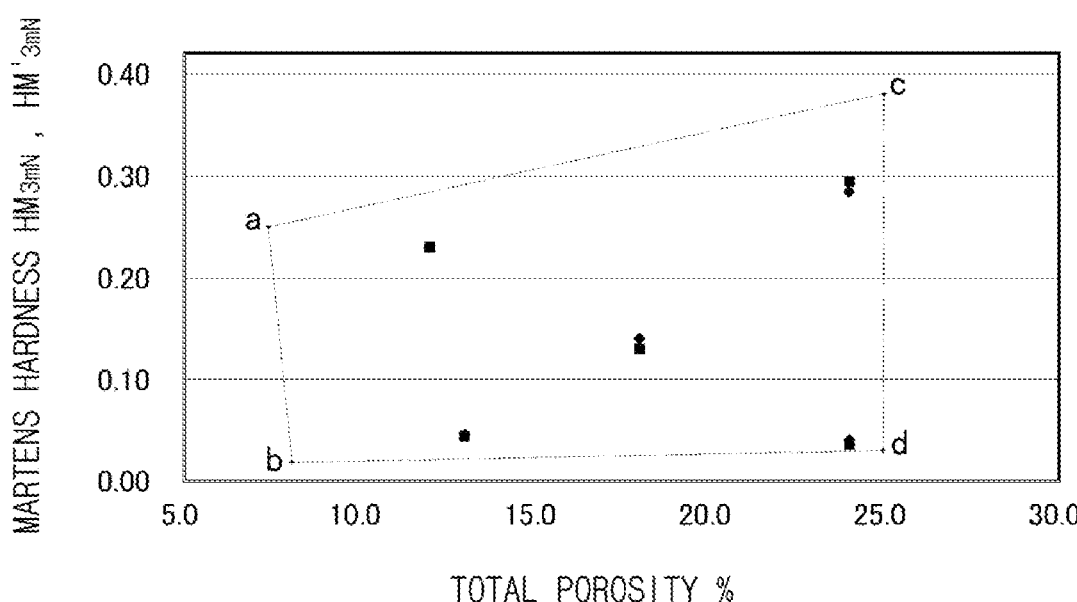

【FIG. 3】
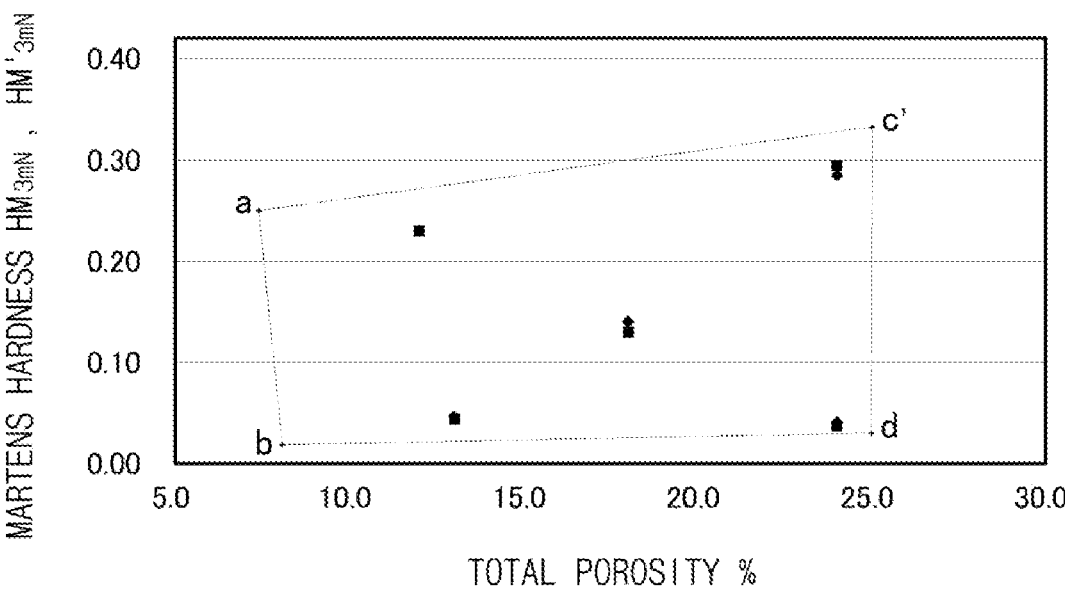

MULTILAYER TUBE

CROSS-REFERENCE TO RELATED APPLICATIONS

This application is the United States national phase of International Application No. PCT/JP2021/006539 filed Feb. 22, 2021, and claims priority to Japanese Patent Application Nos. 2020-032484 filed Feb. 27, 2020, 2020-075058 filed Apr. 20, 2020, 2020-120206 filed Jul. 13, 2020, and 2020-129751 filed Jul. 30, 2020, the disclosures of which are hereby incorporated by reference in their entireties.

BACKGROUND OF THE DISCLOSURE

Field of the Disclosure

The present disclosure relates to a laminated tube that contains polytetrafluoroethylene as a main component and that exhibits excellent airtightness durability and bending resistance.

Description of Related Art

In applications where chemical resistance, heat resistance, etc. are required, a tube made of polytetrafluoroethylene (hereinafter referred to as PTFE) having a porous structure is used as a tube that exhibits excellent flexibility. A tube formed by imparting airtightness to the tube having the porous structure (Patent Document 1), a tube formed by disposing a layer made of polytetrafluoroethylene having a solid structure and a thermoplastic fluorine resin on the tube having the porous structure (Patent Document 2), etc. are known. In these flexible tubes, most of each of the tubes is composed of PTFE having a porous structure, and therefore it is possible to bend the tubes with a small bending radius. If each tube is repeatedly bent with such a small bending radius, however, there are problems that large load is applied to an inner layer composed of a thin film of solid PTFE, cracks occur at an early stage, and airtightness is lowered.

A laminated tube made of porous PTFE having an airtight layer as an inner layer is used in the state in which a fluid passes through the tube or a jig, a cable, etc. is inserted through the tube in each application; however, there is another problem that, if the bending radius of the tube is too small, a bent portion of the tube becomes flat, whereby it is difficult to use the tube.

Patent Document 1: Japanese Patent Application Publication No. H6-270301

Patent Document 2: Japanese Patent Application Publication No. H8-72178

SUMMARY OF THE DISCLOSURE

It is an object of the present disclosure to provide a laminated tube that is flexible and exhibits excellent airtightness durability and that contains polytetrafluoroethylene as a main component. It is another object of the present disclosure to provide a flexible laminated tube that exhibits excellent bending resistance, whereby flatness of the tube is inhibited when the tube is bent.

As the result of assiduous studies to solve the problems as described above, the inventor of the present disclosure has found that a laminated tube including polytetrafluoroethylene as a main component, the laminated tube being configured such that, when the total porosity (%) of the tube is plotted on the horizontal axis of a coordinate graph and the Martens hardness ($HM_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c (25, 0.38), and d (25, 0.03), on the graph, is preferable to solve the above problems, and has completed the present disclosure.

In the laminated tube, when the total porosity (%) of the tube is plotted on the horizontal axis of the coordinate graph and the Martens hardness ($HM_{3\ mN}$) of the tube is plotted on the vertical axis of the coordinate graph, it is more preferable for coordinate points representing the characteristics of the tube to be located in a quadrangle that is bounded by four coordinate points, namely a (7.5, 0.25), b (8, 0.02), c' (25, 0.33), and d (25, 0.03), on the graph.

In addition, the problems of the present disclosure are preferably solved by a laminated tube including polytetrafluoroethylene as a main component, the laminated tube being configured such that, when the total porosity (%) of the tube is plotted on the horizontal axis of a coordinate graph and the Martens hardness ($HM'_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c (25, 0.38), and d (25, 0.03), on the graph.

In the laminated tube, when the total porosity (%) of the tube is plotted on the horizontal axis of the coordinate graph and the Martens hardness ($HM'_{3\ mN}$) of the tube is plotted on the vertical axis of the coordinate graph, it is more preferable for coordinate points representing the characteristics of the tube to be located in a quadrangle that is bounded by four coordinate points, namely a (7.5, 0.25), b (8, 0.02), c' (25, 0.33), and d (25, 0.03), on the graph.

In addition, the laminated tube according to the present disclosure is a laminated tube including polytetrafluoroethylene as a main component, wherein it is preferable for the laminated tube to be a laminated tube having a total porosity of 8% to 27% and wherein it is preferable for the indentation depth of an indenter and the Martens hardness of the laminated tube measured on an inner surface of the laminated tube in accordance with ISO14577-1 to satisfy Equations (1) and (2) below.

$$0.02 \leq HM_{3\ mN} \leq 0.38 \qquad \text{Equation (1)}$$

$$-0.0450/\mu m \leq (HM_{4\ mN} - HM_{3\ mN})/(D_{4\ mN} - D_{3\ mN}) \leq -0.0010/\mu m \qquad \text{Equation (2)}$$

Here, $D_{3\ mN}$ (μm) and $HM_{3\ mN}$ indicate the indentation depth of the indenter and the Martens hardness of the laminated tube, respectively, when test force reaches 3 mN in a load application process, and $D_{4\ mN}$ (μm) and $HM_{4\ mN}$ indicate the indentation depth of the indenter and the Martens hardness of the laminated tube, respectively, when the test force reaches 4 mN, which is the maximum test force.

It is more preferable for the indentation depth of the indenter and the Martens hardness of the laminated tube measured on the inner surface of the laminated tube according to the present disclosure in accordance with ISO14577-1 to satisfy Equations (3) and (4) below.

$$0.03 \leq HM_{3\ mN} \leq 0.33 \qquad \text{Equation (3)}$$

$$-0.0400/\mu m \leq (HM_{4\ mN} - HM_{3\ mN})/(D_{4\ mN} - D_{3\ mN}) \leq -0.0013/\mu m \qquad \text{Equation (4)}$$

It is more preferable for the indentation depth of the indenter and the Martens hardness of the laminated tube measured on the inner surface of the laminated tube according to the present disclosure in accordance with ISO14577-1 to satisfy Equations (5) and (6) below.

$$0.04 \leq HM_{3\ mN} \leq 0.25 \qquad \text{Equation (5)}$$

$$-0.0300/\mu m \leq (HM_{4\ mN} - HM_{3\ mN})/(D_{4\ mN} - D_{3\ mN}) \leq -0.0015/\mu m \qquad \text{Equation (6)}$$

In addition, the laminated tube according to the present disclosure is a laminated tube including polytetrafluoroethylene as a main component, wherein it is preferable for the laminated tube to be a laminated tube having a total porosity of 8% to 27% and wherein it is preferable for the indentation depth of an indenter and the Martens hardness of the laminated tube measured on an inner surface of the laminated tube in accordance with ISO14577-1 to satisfy Equations (7) and (8) below.

$$0.02 \leq HM'_{3\ mN} \leq 0.38 \qquad \text{Equation (7)}$$

$$-0.0700/\mu m \leq (HM'_{3\ mN} - HM'_{2.5\ mN})/(D'_{3\ mN} - D'_{2.5\ mN}) \leq -0.0020/\mu m \qquad \text{Equation (8)}$$

Here, $D'_{2.5\ mN}$ (μm) and $HM'_{2.5\ mN}$ indicate the indentation depth of the indenter and the Martens hardness of the laminated tube, respectively, when the test force reaches 2.5 mN in the load application process, and $D'_{3\ mN}$ (μm) and $HM'_{3\ mN}$ indicate the indentation depth of the indenter and the Martens hardness of the laminated tube, respectively, when the test force reaches 3 mN, which is the maximum test force.

It is more preferable for the indentation depth of the indenter and the Martens hardness of the laminated tube measured on the inner surface of the laminated tube according to the present disclosure in accordance with ISO14577-1 to satisfy Equations (9) and (10) below.

$$0.03 \leq HM'_{3\ mN} \leq 0.33 \qquad \text{Equation (9)}$$

$$-0.0650/\mu m \leq (HM'_{3\ mN} - HM'_{2.5\ mN})/(D'_{3\ mN} - D'_{2.5\ mN}) \leq -0.0027/\mu m \qquad \text{Equation (10)}$$

It is more preferable for the indentation depth of the indenter and the Martens hardness of the laminated tube measured on the inner surface of the laminated tube according to the present disclosure in accordance with ISO14577-1 to satisfy Equations (11) and (12) below.

$$0.04 \leq HM'_{3\ mN} \leq 0.25 \qquad \text{Equation (11)}$$

$$-0.0600/\mu m \leq (HM'_{3\ mN} - HM'_{2.5\ mN})/(D'_{3\ mN} - D'_{2.5\ mN}) \leq -0.0055/\mu m \qquad \text{Equation (12)}$$

Also, in the laminated tube according to the present disclosure, when the total porosity (%) of the tube is plotted on the horizontal axis of the coordinate graph and the Martens hardness ($HM_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c (25, 0.38), and d (25, 0.03), on the graph, wherein it is preferable to satisfy Equation (2) above, it is more preferable to satisfy Equation (4), and it is much more preferable to satisfy Equation (6).

Also, in the laminated tube according to the present disclosure, when the total porosity (%) of the tube is plotted on the horizontal axis of the coordinate graph and the Martens hardness ($HM_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c' (25, 0.33), and d (25, 0.03), on the graph, wherein it is preferable to satisfy Equation (2) above, it is more preferable to satisfy Equation (4), and it is much more preferable to satisfy Equation (6).

Also, in the laminated tube according to the present disclosure, when the total porosity (%) of the tube is plotted on the horizontal axis of the coordinate graph and the Martens hardness ($HM'_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c (25, 0.38), and d (25, 0.03), on the graph, wherein it is preferable to satisfy Equation (8) above, it is more preferable to satisfy Equation (10), and it is much more preferable to satisfy Equation (12).

Also, in the laminated tube according to the present disclosure, when the total porosity (%) of the tube is plotted on the horizontal axis of the coordinate graph and the Martens hardness ($HM'_{3\ mN}$) of the tube is plotted on the vertical axis of the coordinate graph, coordinate points representing the characteristics of the laminated tube are located in a quadrangle that is bounded by four coordinate points, namely a (7.5, 0.25), b (8, 0.02), c' (25, 0.33), and d (25, 0.03), on the graph, wherein it is preferable to satisfy Equation (8) above, it is more preferable to satisfy Equation (10), and it is much more preferable to satisfy Equation (12).

A laminated tube according to the present disclosure exhibits excellent airtightness durability and is capable of maintaining airtightness or liquid tightness even when the tube is repeatedly bent 50,000 times or more. In addition, when the tube is naturally bent, the tube may be used in the state in which flatness of a bent portion of the tube is inhibited.

BRIEF DESCRIPTION OF THE DRAWINGS

FIG. 1 is a schematic view showing an example of a laminated tube according to the present disclosure.

FIG. 2 is an example of a graph showing total porosity and Martens hardness HM of the tube in the laminated tube according to the present disclosure.

FIG. 3 is an example of a graph showing total porosity and Martens hardness HM of the tube in the laminated tube according to the present disclosure.

DETAILED DESCRIPTION

A laminated tube according to the present disclosure contains PTFE as a main component. In the present disclosure, the "main component" means one of all resins constituting the tube that occupies 90% or more in volume. PTFE used in the present disclosure may be a homopolymer of tetrafluoroethylene (hereinafter referred to as "TFE") or modified PTFE. The modified PTFE is a polymer of TFE and a small amount of a monomer other than TFE. Examples of the small amount of the monomer other than TFE include chlorotrifluoroethylene (CTFE), hexafluoropropylene (HFP), and perfluoroalkyl vinyl ether (PPVE). The laminated tube may contain a resin other than PTFE, and examples of the resin other than PTFE constituting the laminated tube include a tetrafluoroethylene/hexafluoroethylene copolymer (FEP), a tetrafluoroethylene/perfluoroalkyl vinyl ether copolymer (PFA), an ethylene/tetrafluoroethylene copolymer (ETFE), a polychlorotrifluoroethylene copolymer (PCTFE), and polyvinylidene fluoride (PVDF).

The laminated tube according to the present disclosure has two or more layers. As the result of having two or more layers, a multifunctional tube may be formed. FIG. 1 schematically shows an example of the laminated tube according to the present disclosure. The laminated tube 1 of FIG. 1 has a two-layer structure as a simple example. For example, one of the two layers may be formed as a dense layer or an airtight layer. The dense layer refers to a layer that exhibits excellent airtightness or liquid tightness, and a flexible layer refers to a layer that exhibits a high degree of flexibility. In the present disclosure, other functional layers may be provided.

The above-described dense layer is preferably composed of high-density PTFE, and the thickness of the dense layer is preferably 0.075 mm to 0.20 mm, more preferably 0.15 mm or less. In order to form the dense layer, a method of extruding PTFE into a high-density tube shape, a method of winding a high-density PTFE film into a cylindrical shape, etc. may be used. Specifically, the following methods may be used.

When a method of extruding PTFE into a high-density tube shape is used, the dense layer may be formed, for example, as follows.

A preformed body is prepared by mixing PTFE fine powder and an organic solvent, serving as an extrusion aid, and pressurizing the mixture. Next, the preformed body is molded into a tube shape using an extruder. The molded tube-shaped PTFE is heated to a temperature equal to or lower than the melting point of PTFE in order to volatilize an organic solvent and to dry the tube-shaped PTFE. The dried tube-shaped PTFE is heated to a temperature equal to or higher than the melting point of PTFE, whereby pores generated by volatilization of the organic solvent are closed, and therefore a high-density PTFE tube is obtained. In addition, the dense layer may be uniaxially or biaxially stretched while being heated to a temperature equal to or lower than the melting point of PTFE after volatilizing an organic solvent in a tube-shaped PTFE molded from a preformed body, and may then be compressed to form high-density PTFE. When compression and densification are performed after uniaxial or biaxial stretching, it is possible to perform adjustment, such as manipulation of elongation or tension characteristics and wall thickness. The dense layer formed as described above may be prepared by covering a core material with this high-density PTFE tube using a pipe having an outer diameter substantially the same as the inner diameter of the laminated tube to be produced as the core material. The dense layer thus formed may be heated to a temperature equal to or higher than the melting point of PTFE and sintered, and then other layers may be laminated, or the other layers may be laminated in the state in which the dense layer is unsintered.

When a method of winding a high-density PTFE film into a cylindrical shape is used, the dense layer may be formed, for example, as follows.

A preformed body is prepared by mixing PTFE fine powder and an organic solvent, serving as an extrusion aid, and pressurizing the mixture. Next, the preformed body is molded into a film shape using an extruder. The molded film-shaped PTFE is heated to a temperature equal to or lower than the melting point of PTFE in order to volatilize the organic solvent and to dry the film-shaped PTFE. The dried film-shaped PTFE may be heated to a temperature equal to or higher than the melting point of PTFE to obtain a high-density PTFE film. For example, a pipe having an outer diameter substantially the same as the inner diameter of the laminated tube to be produced may be used as a core material, and this high-density PTFE film may be wound around the core material to form a dense layer of the laminated tube. The high-density PTFE film may be wound around the core material by either cigarette winding or spiral winding. In addition, the dense layer may be uniaxially or biaxially stretched while being heated to a temperature equal to or lower than the melting point of PTFE after volatilizing an organic solvent in film-shaped PTFE molded from the preformed body, and may then be compressed to form a high-density PTFE film. Even in this case, the high-density PTFE film may be wound around the core material to form the dense layer, in the same manner. Alternatively, a uniaxially or biaxially stretched PTFE film may be wound around the core material, and may then be compressed from an outer surface thereof through a die or the like to form a high-density PTFE film. The dense layer thus formed may be heated to a temperature equal to or higher than the melting point of PTFE and sintered, and then other layers may be laminated, or the other layers may be laminated in the state in which the dense layer is unsintered.

The above-described flexible layer is preferably composed of PTFE having a porosity of 20% or more. The density of PTFE having a porosity of 20% or more is reduced because the PTFE resin contains air in pores thereof. In the present disclosure, the thickness of the flexible layer may be appropriately set depending on the strength required by the laminated tube, and is usually about 0.10 mm to 2.0 mm.

The flexible layer may be formed, for example, using a method of covering the outside of the tube including the dense layer with a PTFE tube having a porosity of 20% or more through uniaxial or biaxial stretching after extrusion, a method of winding a uniaxially or biaxially stretched PTFE film around the outside of the tube including the dense layer, etc. Specifically, the following methods may be used.

When a method of covering the outside of the tube including the dense layer with a PTFE tube having a porosity of 20% or more through uniaxial or biaxial stretching is used, the flexible layer may be formed, for example, as follows.

A preformed body prepared by mixing PTFE fine powder and an organic solvent is introduced into an extruder and is then molded into a tube shape. The molded tube-shaped PTFE is heated to a temperature equal to or lower than the melting point of PTFE to volatilize the organic solvent, and is then uniaxially or biaxially stretched at a temperature equal to or lower than the melting point of PTFE to obtain a PTFE tube having a porosity of 20% or more. The outside of the tube including the dense layer prepared as described above is covered with the PTFE tube having a porosity of 20% or more thus prepared to form a flexible layer. The entirety of the formed laminated tube is heated to a temperature equal to or higher than the melting point of PTFE (e.g. 360° C.) and is then sintered so as to be integrated.

In addition, when a method of winding a uniaxially or biaxially stretched PTFE film having a porosity of 20% or more around the tube including the dense layer is used, the flexible layer may be formed, for example, as follows.

A preformed body prepared by mixing PTFE fine powder and an organic solvent is introduced into an extruder and is then molded into a film shape. The molded film-shaped PTFE is heated to a temperature equal to or lower than the melting point of PTFE to volatilize the organic solvent, and is then uniaxially or biaxially stretched at a temperature equal to or lower than the melting point of PTFE to obtain a PTFE film having a porosity of 20% or more. The PTFE film having a porosity of 20% or more thus prepared is wound around the outside of the tube including the dense layer prepared as described above to form a flexible layer. The PTFE film may be wound around the outside of the tube including the dense layer by either cigarette winding or spiral winding. The entirety of the formed laminated tube is heated to a temperature equal to or higher than the melting point of PTFE (e.g. 360° C.) and is then sintered so as to be integrated.

The total porosity of the laminated tube according to the present disclosure is preferably in the range from about 8% to about 27%. Here, the total porosity of the tube refers to the ratio (percentage) of the volume of pores included in the entire laminated tube per unit length to the volume of the entire laminated tube of the unit length. A laminated tube that includes two or more layers and has total porosity within the above-specified range exhibits excellent airtightness durability. In the present disclosure, airtightness durability means that airtightness or liquid tightness is maintained even when the tube is repeatedly bent 50,000 times or more. In the conventional tube as described above, a part of the tube is cracked and airtightness of the tube is lowered as the result of repeated bending tests, whereas the tube according to the present disclosure exhibits excellent airtightness durability, and therefore airtightness of the tube is not lowered even when the tube is bent 50,000 times or more.

The total porosity of the prepared laminated tube may be calculated, for example, as follows. The laminated tube is cut to a unit length (e.g. 10 mm), the inner diameter and the outer diameter of the cut laminated tube are accurately measured, and the volume V of the cut laminated tube is calculated. The laminated tube in volume V includes pores having a volume p. The weight of the laminated tube in volume V is measured, and the density (g/cm$^3$) of the laminated tube is calculated. When the laminated tube is mainly composed of PTFE, the total porosity of the prepared laminated tube is calculated by the following equation under the condition in which the density of high-density PTFE is 2.2 g/cm$^3$.

$$\text{Total Porosity} = p/V = 1 - (\text{Density of Laminated Tube}/2.2)$$

In the laminated tube according to the present disclosure, it is preferable for the indentation depth of an indenter and the Martens hardness of the laminated tube measured on an inner surface of the laminated tube in accordance with ISO14577-1 to satisfy Equations (1) and (2) below.

$$0.02 \leq HM_{3\ mN} \leq 0.38 \qquad\qquad \text{Equation (1)}$$

$$-0.0450/\mu m \leq (HM_{4\ mN} - HM_{3\ mN})/(D_{4\ mN} - D_{3\ mN}) \leq -0.0010/\mu m \qquad\qquad \text{Equation (2)}$$

In the laminated tube according to the present disclosure, it is more preferable for the indentation depth of the indenter and the Martens hardness of the laminated tube measured on the inner surface of the laminated tube in accordance with ISO14577-1 to satisfy Equations (3) and (4) below.

$$0.03 \leq HM_{3\ mN} \leq 0.33 \qquad\qquad \text{Equation (3)}$$

$$-0.0400/\mu m \leq (HM_{4\ mN} - HM_{3\ mN})/(D_{4\ mN} - D_{3\ mN}) \leq -0.0013/\mu m \qquad\qquad \text{Equation (4)}$$

In the laminated tube according to the present disclosure, it is more preferable for the indentation depth of the indenter and the Martens hardness of the laminated tube measured on the inner surface of the laminated tube in accordance with ISO14577-1 to satisfy Equations (5) and (6) below.

$$0.04 \leq HM_{3\ mN} \leq 0.25 \qquad\qquad \text{Equation (5)}$$

$$-0.0300/\mu m \leq (HM_{4\ mN} - HM_{3\ mN})/(D_{4\ mN} - D_{3\ mN}) \leq -0.0015/\mu m \qquad\qquad \text{Equation (6)}$$

Here, $D_{3\ mN}$ (μm) and $HM_{3\ mN}$ indicate the indentation depth of the indenter and the Martens hardness of the laminated tube, respectively, when test force reaches 3 mN in a load application process, and $D_{4\ mN}$ (μm) and $HM_{4\ mN}$ indicate the indentation depth of the indenter and the Martens hardness of the laminated tube, respectively, when test force reaches 4 mN, which is the maximum test force, in the load application process. When the above-defined relationships are satisfied, it is easy to bend the tube with appropriate force when the tube is bent, and it is not easy to flatten the tube when the tube is bent.

Also, in the laminated tube according to the present disclosure, it is preferable for the indentation depth of the indenter and the Martens hardness of the laminated tube measured on the inner surface of the laminated tube in accordance with ISO14577-1 to satisfy Equations (7) and (8) below.

$$0.02 \leq HM'_{3\ mN} \leq 0.38 \qquad\qquad \text{Equation (7)}$$

$$-0.0700/\mu m \leq (HM'_{3\ mN} - HM'_{2.5\ mN})/(D'_{3\ mN} - D'_{2.5\ mN}) \leq -0.0020/\mu m \qquad\qquad \text{Equation (8)}$$

In the laminated tube according to the present disclosure, it is more preferable for the indentation depth of the indenter and the Martens hardness of the laminated tube measured on the inner surface of the laminated tube in accordance with ISO14577-1 to satisfy Equations (9) and (10) below.

$$0.03 \leq HM'_{3\ mN} \leq 0.33 \qquad\qquad \text{Equation (9)}$$

$$-0.0650/\mu m \leq (HM'_{3\ mN} - HM'_{2.5\ mN})/(D'_{3\ mN} - D'_{2.5\ mN}) \leq -0.0027/\mu m \qquad\qquad \text{Equation (10)}$$

In the laminated tube according to the present disclosure, it is more preferable for the indentation depth of the indenter and the Martens hardness of the laminated tube measured on the inner surface of the laminated tube in accordance with ISO14577-1 to satisfy Equations (11) and (12) below.

$$0.04 \leq HM'_{3\ mN} \leq 0.25 \qquad\qquad \text{Equation (11)}$$

$$-0.0600/\mu m \leq (HM'_{3\ mN} - HM'_{2.5\ mN})/(D'_{3\ mN} - D'_{2.5\ mN}) \leq -0.0055/\mu m \qquad\qquad \text{Equation (12)}$$

Here, $D'_{2.5\ mN}$ (μm) and $HM'_{2.5\ mN}$ indicate the indentation depth of the indenter and the Martens hardness of the laminated tube, respectively, when the test force reaches 2.5 mN in the load application process, and $D'_{3\ mN}$ (μm) and $HM'_{3\ mN}$ indicate the indentation depth of the indenter and the Martens hardness of the laminated tube, respectively, when the test force reaches 3 mN, which is the maximum test force, in the load application process. When the above-defined relationships are satisfied, it is easy to bend the tube when the tube is bent, and it is not easy to flatten the tube when the tube is bent.

Also, in the laminated tube according to the present disclosure, when the total porosity (%) of the tube is plotted on the horizontal axis of a coordinate graph and the Martens hardness $HM_{3\ mN}$ of the tube is plotted on the vertical axis of the coordinate graph, it is preferable for coordinate points representing the characteristics of the laminated tube to be located in a quadrangle that is bounded by four coordinate points, namely a (7.5, 0.25), b (8, 0.02), c (25, 0.38), and d (25, 0.03), on the graph.

In the laminated tube according to the present disclosure, when the total porosity (%) of the tube is plotted on the horizontal axis of the coordinate graph and the Martens hardness $HM_{3\ mN}$ of the tube is plotted on the vertical axis of the coordinate graph, it is more preferable for coordinate points representing the characteristics of the laminated tube to be located in a quadrangle that is bounded by four coordinate points, namely a (7.5, 0.25), b (8, 0.02), c' (25, 0.33), and d (25, 0.03), on the graph.

In addition, it is preferable for the laminated tube to further satisfy Equation (2), Equation (4), Equation (6), Equation (8), Equation (10), or Equation (12) above. When the characteristic value of the laminated tube is within the above range, it is easy to appropriately bend the tube when the tube is naturally bent, and it is possible to further inhibit flatness of a bent portion.

Also, in the laminated tube according to the present disclosure, when the total porosity (%) of the tube is plotted on the horizontal axis of the coordinate graph and the Martens hardness $HM'_{3\ mN}$ of the tube is plotted on the vertical axis of the coordinate graph, it is preferable for coordinate points representing the characteristics of the laminated tube to be located in a quadrangle that is bounded by four coordinate points, namely a (7.5, 0.25), b (8, 0.02), c (25, 0.38), and d (25, 0.03), on the graph.

In the laminated tube according to the present disclosure, when the total porosity (%) of the tube is plotted on the horizontal axis of the coordinate graph and the Martens hardness $HM'_{3\ mN}$ of the tube is plotted on the vertical axis of the coordinate graph, it is more preferable for coordinate points representing the characteristics of the laminated tube to be located in a quadrangle that is bounded by four coordinate points, namely a (7.5, 0.25), b (8, 0.02), c' (25, 0.33), and d (25, 0.03), on the graph.

In addition, it is preferable for the laminated tube to further satisfy Equation (2), Equation (4), Equation (6), Equation (8), Equation (10), or Equation (12) above. When the characteristic value of the laminated tube is within the above range, it is possible to bend the tube with appropriate force when the tube is naturally bent, and it is possible to further inhibit flatness of a bent portion.

The present disclosure will be described in detail with reference to examples.

Example 1

PTFE fine powder and an organic solvent were mixed with each other in a container, were sieved to remove lumps, and were then introduced into a preform machine to prepare a preformed body. The prepared preformed body was introduced into an extruder having a cylinder diameter of 20 mm and was molded into a tube shape. Subsequently, the tube-shaped formed body was dried at 130° C. and was sintered in an oven at 350° C. to prepare a high-density PTFE tube. As the dimensions of the tube, the inner diameter of the tube was 3.75 mm, and the wall thickness of the tube was 0.135 mm. Subsequently, a stainless steel pipe having a diameter of 3.7 mm, serving as a core material, was covered with this high-density PTFE tube. A PTFE film having a thickness of 0.10 mm and a porosity of 30% was spirally wound around the outer circumference of the high-density PTFE tube such that the layer thickness of the PTFE film having a porosity of 30% was 0.465 mm.

The PTFE laminate thus prepared was sintered at a temperature of 360° C. or higher for 10 minutes so as to be integrated, and was then separated from the stainless steel pipe to prepare a laminated tube according to the present disclosure having a total porosity of 12%.

Comparative Example 1

A preformed body of PTFE was prepared in the same manner as in Example 1 and was molded into a tube shape using an extruder. Subsequently, the tube-shaped formed body was dried at 130° C. and was sintered in an oven at 350° C. to prepare a high-density PTFE tube having an inner diameter of 3.75 mm and a wall thickness of 0.06 mm. Subsequently, a stainless steel pipe having a diameter of 3.7 mm, serving as a core material, was covered with this high-density PTFE tube. An unsintered PTFE film having a thickness of 0.10 mm and a porosity of 45% was spirally wound around the outer circumference of the high-density PTFE tube such that the layer thickness of the PTFE film having a porosity of 45% was 0.5 mm.

The PTFE laminate thus prepared was sintered at a temperature of 360° C. or higher for 10 minutes so as to be integrated, and was then separated from the stainless steel pipe to prepare a laminated tube having a total porosity of 40%.

<Airtightness Durability Test>

An airtightness durability test was conducted on the prepared laminated tube in order to check durability thereof. In the state in which one end of the prepared laminated tube was fixed, the tube was repeatedly bent right and left with a radius of curvature of 10 mm, and then it was checked whether there was air leakage from the inside to the outside of the laminated tube (airtightness test). The airtightness test was performed at intervals of once every 5,000 times up to 50,000 times of repeated bending, and thereafter the airtightness test was performed at intervals of once every 20,000 times. When no air leakage occurred in the airtightness test even after repeated bending exceeded 200,000 times, the test was terminated.

In the airtightness durability test, the laminated tube according to the present disclosure, i.e. the tube of Example 1 having a total porosity of 12%, did not change in appearance even after 200,000 times of repeated bending was completed, and maintained the same airtightness as before the test, whereas the tube of Comparative Example 1 having a total porosity of 40% failed to maintain airtightness after only about 40,000 times of bending.

Example 2

PTFE fine powder and an aid were mixed with each other in a container, were sieved to remove lumps, and were then introduced into a preform machine to prepare a preformed body. The prepared preformed body was introduced into an extruder having a cylinder diameter of 20 mm and was molded into a tube shape. Subsequently, the tube-shaped formed body was dried at 130° C. and was sintered in an oven at 350° C. to prepare a high-density PTFE tube having an inner diameter of 3.23 mm and a wall thickness of 0.09 mm. Subsequently, a stainless steel pipe having a diameter of 3.2 mm, serving as a core material, was covered with this high-density PTFE tube. A PTFE film having a thickness of 0.10 mm and a porosity of 30% was spirally wound around the outer circumference of the high-density PTFE tube such that the layer thickness of the PTFE film having a porosity of 30% was 0.41 mm.

The PTFE laminate thus prepared was sintered at a temperature of 360° C. or higher for 10 minutes so as to be integrated, and was then separated from the stainless steel pipe to prepare a laminated tube according to the present disclosure having a total porosity of 13%.

Example 3

PTFE fine powder and an aid were mixed with each other in a container, were sieved to remove lumps, and were then introduced into a preform machine to prepare a preformed body. The prepared preformed body was introduced into an extruder and was molded into a tube shape. Subsequently, the tube-shaped formed body was dried at 130° C. and was heated to 350° C. or higher so as to be sintered. The high-density PTFE tube thus prepared had an inner diameter of 3.75 mm and a wall thickness of 0.12 mm. Separately, a PTFE tube having a porosity of 20% or more was prepared. The PTFE tube having a porosity of 20% or more was prepared by mixing PTFE fine powder and an aid with each other to prepare a preformed body, molding the preformed body into a tube shape using an extruder, and stretching the tube in a longitudinal direction thereof at a temperature of 327° C. or lower. The obtained tube had a porosity of 52% and a wall thickness of 0.5 mm. Subsequently, the outer circumference of a brass pipe having a diameter of 3.7 mm, serving as a core material, was covered with the prepared high-density PTFE tube. The outside of the tube was covered with a PTFE tube having a porosity of 52%. The PTFE laminate thus prepared was sintered at a temperature of 360° C. or higher for 10 minutes so as to be integrated, and was then separated from the brass pipe to prepare a multilayer tube according to the present disclosure having a total porosity of 24%.

Example 4

PTFE fine powder and an aid were mixed with each other in a container, were sieved to remove lumps, and were then introduced into a preform machine to prepare a preformed body. The prepared preformed body was introduced into an extruder and was molded into a tube shape. Subsequently, the tube-shaped formed body was dried at 130° C. and was then uniaxially stretched to prepare a PTFE tube having a porosity of 70%. Separately from this PTFE tube having a porosity of 70%, a PFA film having a thickness of 0.02 mm was prepared. A stainless steel pipe having a diameter of 3.7 mm, serving as a core material, was covered with the above PTFE tube having a porosity of 70%, and then the PTFE tube was compressed through a die to form a high-density PTFE layer having a thickness of 0.100 mm. The PFA film having a thickness of 0.02 mm was wound around the outer circumference of the PTFE layer by cigarette winding. Furthermore, an unsintered PTFE film with a thickness of 0.145 mm and a porosity of 35% was spirally wound around the outer circumference of the PFA film so as to have a thickness of 0.48 mm.

The PTFE laminate thus prepared was sintered at a temperature of 360° C. or higher for 10 minutes, and was then separated from the stainless steel pipe to prepare a multilayer tube according to the present disclosure having a total porosity of 18%.

Example 5

PTFE fine powder and an aid were mixed with each other in a container, were sieved to remove lumps, and were then introduced into a preform machine to prepare a preformed body. The prepared preformed body was introduced into an extruder and was molded into a tube shape. Subsequently, the tube-shaped formed body was dried at 130° C. and was then uniaxially stretched to prepare a PTFE tube having a porosity of 70%. A stainless steel pipe having a diameter of 3.2 mm, serving as a core material, was covered with the above PTFE tube having a porosity of 70%, and then the PTFE tube was compressed through a die to form a high-density PTFE layer having a thickness of 0.100 mm. An unsintered PTFE film with a thickness of 0.145 mm and a porosity of 35% was spirally wound on the PTFE layer so as to have a thickness of 0.32 mm.

The PTFE laminate thus prepared was sintered at a temperature of 360° C. or higher for 10 minutes, and was then separated from the stainless steel pipe to prepare a multilayer tube according to the present disclosure having a total porosity of 24%.

<Instrumentation Indentation Hardness Test>

An instrumentation indentation hardness test was performed from an inner surface side of the laminated tube in accordance with ISO14577-1. In this measurement, relationship data between the Martens hardness of the laminated tube and the indentation depth of an indenter are obtained. As a measurement instrument, a Shimadzu dynamic ultra-fine hardness tester DUH-201S (manufactured by Shimadzu Corporation) was used. Measurement was carried out using a test method in which test force was controlled. A measurement sample was prepared by cutting the prepared laminated tube into a strip having a width of about 2.0 to 2.5 mm in a longitudinal direction in which the laminated tube extended. When measuring a tube-shaped sample, it is preferable to cut the sample into a thin strip, since the strip is not affected by radial bending of the tube. The cut sample was fixed to a test piece holder provided with a support rigid in an indentation direction, and the position of the sample was adjusted using a magnifying glass such that the surface of the sample on the inner surface side of the tube and the indenter were in perpendicular contact with each other. The measurement conditions were set as follows, and other conditions and operations were based on the description of ISO14577-1.

Measurement Conditions 1

Measurement mode: Indenter indentation test (Load-unloading test)

Measurement indenter: Triangular pyramid indenter with an inter-ridge angle of 115°(Berkovich type)

Maximum test force: 4 mN

Minimum test force: 0.02 mN

Loading speed: 0.1463 mN/sec

Load holding time: 10 sec

Unloading time: 10 sec

Objective lens magnification: 50 times

Measurement temperature: 23° C.±2° C.

Measurement Conditions 2

Measurement mode: Indenter indentation test (Load-unloading test)

Measurement indenter: Triangular pyramid indenter with an inter-ridge angle of 115°(Berkovich type)

Maximum test force: 3 mN

Minimum test force: 0.02 mN

Loading speed: 0.1463 mN/sec

Load holding time: 10 sec

Unloading time: 10 sec

Objective lens magnification: 50 times

Measurement temperature: 23° C.±2° C.

<Bending Test-Measurement of Deformed External Dimensions>

The bending test was performed in accordance with the method A of JIS K6330-9:2003. The bending radius (C×½) of the laminated tube at the time of measurement was set to 10 mm. The average outer diameter D of the target laminated tube was measured using a laser outer-diameter measurement instrument. The distance between two sheets of parallel guide plates was set so as to be larger than (C+2D), the laminated tube was located between the guide plates, and then the distance between the guide plates was reduced to (C+2D) in that state. Deformation of the laminated tube was measured at a bent portion of the laminated tube in the state in which the distance between the guide plates was (C+2D). The outer-diameter dimension T (minor diameter) of the deformed laminated tube was measured using the laser outer-diameter measurement instrument, and the value of T/D was calculated. The value of T/D is defined as bending flatness. The measurement was performed at 23° C.±2° C.

<Bending Test Force Measurement>

The bending test force was measured in accordance with JIS K7171:2016. The distance between fulcrums was 64 mm, and the test speed was 500 mm/min. The length of a test piece was 80 mm, and the measurement was performed in an environment of 23° C.±2° C. The test force at a bending of 25 mm was recorded as the bending test force (N).

The results of each test performed on the tube of each example are shown in Table 1 and Table 2. Table 1 shows the results measured under the first measurement conditions of the instrumentation indentation hardness test, and Table 2 shows the results measured under the second measurement conditions of the instrumentation indentation hardness test.

14 priate force, and flatness of each tube at the bent portion thereof was inhibited. In the airtightness durability test, the tubes according to the examples of the present disclosure did not change in appearance even after 200,000 times of repeated bending was completed, and maintained the same airtightness as before the test.

INDUSTRIAL APPLICABILITY

A laminated tube according to the present disclosure exhibits high chemical resistance, heat resistance, and flexibility, and also exhibits excellent airtightness durability, and therefore the laminated tube according to the present disclosure is usable to transfer a fluid that is disposed in a place where bending load is repeatedly applied. In particular, the laminated tube according to the present disclosure is preferably usable for applications related to medical treatment, pharmaceuticals, semiconductors, etc., which require high chemical resistance and cleanliness.

TABLE 1

| | | Example 1 | Example 2 | Example 3 | Example 4 | Example 5 |
|---|---|---|---|---|---|---|
| Total porosity | % | 12 | 13 | 24 | 18 | 24 |
| $HM_{3\ mN}$ | | 0.23 | 0.044 | 0.30 | 0.13 | 0.037 |
| $D_{3\ mN}$ | | 7.01 | 16.20 | 6.27 | 9.35 | 17.79 |
| $HM_{4\ mN}$ | | 0.16 | 0.036 | 0.17 | 0.11 | 0.026 |
| $D_{4\ mN}$ | | 9.82 | 20.72 | 8.89 | 11.93 | 24.41 |
| $(HM_{4\ mN}-HM_{3\ mN})/(D_{4\ mN}-D_{3\ mN})$ | $\times10^{-2}$ | −2.55 | −0.18 | −3.84 | −0.94 | −0.16 |
| Bending test force | N | 2.30 | 1.30 | 2.61 | 2.20 | 1.20 |
| Bending flatness | % | 86 | 86 | 91 | 82 | 82 |

TABLE 2

| | | Example 1 | Example 2 | Example 3 | Example 4 | Example 5 |
|---|---|---|---|---|---|---|
| Total porosity | % | 12 | 13 | 24 | 18 | 24 |
| $HM'_{2.5\ mN}$ | | 0.31 | 0.067 | 0.37 | 0.17 | 0.05 |
| $D'_{2.5\ mN}$ | | 5.62 | 12.00 | 5.12 | 7.46 | 13.39 |
| $HM'_{3\ mN}$ | | 0.23 | 0.046 | 0.29 | 0.14 | 0.041 |
| $D'_{3\ mN}$ | | 7.00 | 15.90 | 6.34 | 8.89 | 16.85 |
| $(HM'_{3\ mN}-HM'_{2.5\ mN})/(D'_{3\ mN}-D'_{2.5\ mN})$ | $\times10^{-2}$ | −5.31 | −0.55 | −6.93 | −1.92 | −0.38 |
| Bending test force | N | 2.30 | 1.30 | 2.61 | 2.20 | 1.20 |
| Bending flatness | % | 86 | 86 | 91 | 82 | 82 |

In addition, FIGS. 2 and 3 are graphs in each of which the horizontal axis indicates the total porosity (%) of the tube, and the vertical axis indicates the Martens hardness $HM_{3\ mN}$ or $HM'_{3\ mN}$ of the tube. On the graph of FIG. 2, a quadrangle that is bounded by coordinate points, namely a (7.5, 0.25), b (8, 0.02), c (25, 0.38), and d (25, 0.03), connected via dashed lines and coordinate points representing the characteristics of each example are plotted. On the graph of FIG. 3, a quadrangle that is bounded by coordinate points, namely a (7.5, 0.25), b (8, 0.02), c' (25, 0.33), and d (25, 0.03), connected via dashed lines and coordinate points representing the characteristics of each example are plotted.

In the laminated tubes according to Examples 1 to 5 of the present disclosure, each tube could be bent with an appro-

DESCRIPTION OF REFERENCE NUMERALS

1 Laminated tube according to the present disclosure

The invention claimed is:

1. A laminated tube comprising polytetrafluoroethylene as a main component, the laminated tube having a dense layer, the dense layer comprising high-density sintered PTFE, wherein when total porosity (%) of the tube is plotted on a horizontal axis of a coordinate graph and Martens hardness ($HM_{3\ mN}$) of the tube is plotted on a vertical axis of the coordinate graph, coordinate points representing the relationship between total porosity and Martens hardness of the laminated tube are located in a quadrangle that is bounded by four coordinate points, namely a (7.5, 0.25), b (8, 0.02), c (25, 0.38), and d (25, 0.03), on the graph.

2. The laminated tube according to claim 1, wherein an indentation depth of an indenter and the Martens hardness of the laminated tube measured in accordance with ISO14577 satisfy Equation (2), $$-0.0450/\mu m \leq (HM_{4\,mN} - HM_{3\,mN})/(D_{4\,mN} - D_{3\,mN}) \leq -0.0010/\mu m \qquad \text{Equation (2).}$$

3. The laminated tube according to claim 1, wherein an indentation depth of an indenter and the Martens hardness of the laminated tube measured in accordance with ISO14577 satisfy Equation (4), $$-0.0400/\mu m \leq (HM_{4\,mN} - HM_{3\,mN})/(D_{4\,mN} - D_{3\,mN}) \leq -0.0013/\mu m \qquad \text{Equation (4).}$$

4. The laminated tube according to claim 1, wherein an indentation depth of an indenter and the Martens hardness of the laminated tube measured in accordance with ISO14577 satisfy Equation (6), $$-0.0300/\mu m \leq (HM_{4\,mN} - HM_{3\,mN})/(D_{4\,mN} - D_{3\,mN}) \leq -0.0015/\mu m \qquad \text{Equation (6).}$$

5. A laminated tube comprising polytetrafluoroethylene as a main component the laminated tube having a dense layer, the dense layer comprising high-density sintered PTFE, wherein when total porosity (%) of the tube is plotted on a horizontal axis of a coordinate graph and Martens hardness ($HM'_{3\,mN}$) of the tube is plotted on a vertical axis of the coordinate graph, coordinate points representing the relationship between total porosity and Martens hardness of the laminated tube are located in a quadrangle that is bounded by four coordinate points, namely a (7.5, 0.25), b (8, 0.02), c (25, 0.38), and d (25, 0.03), on the graph.

6. The laminated tube according to claim 5, wherein an indentation depth of an indenter and the Martens hardness of the laminated tube measured in accordance with ISO14577 satisfy Equation (8), $$-0.0700/\mu m \leq (HM_{3\,mN} - HM_{2.5\,mN})/(D'_{3\,mN} - D'_{2.5\,mN}) \leq -0.0020/\mu m \qquad \text{Equation (8).}$$

7. The laminated tube according to claim 5, wherein an indentation depth of an indenter and the Martens hardness of the laminated tube measured in accordance with ISO14577 satisfy Equation (10), $$-0.0650/\mu m \leq (HM'_{3\,mN} - HM'_{2.5\,mN})/(D'_{3\,mN} - D'_{25\,mN}) \leq -0.0027/\mu m \qquad \text{Equation (10).}$$

8. The laminated tube according to claim 5, wherein an indentation depth of an indenter and the Martens hardness of the laminated tube measured in accordance with ISO14577 satisfy Equation (12), $$-0.0600/\mu m \leq (HM'_{3\,mN} - HM'_{2.5\,mN})/(D'_{3\,mN} - D'_{2.5\,mN}) \leq -0.0055/\mu m \qquad \text{Equation (12).}$$

9. A laminated tube comprising polytetrafluoroethylene as a main component, the laminated tube having a dense layer, the dense layer comprising high-density sintered PTFE, wherein when total porosity (%) of the tube is plotted on a horizontal axis of a coordinate graph and Martens hardness ($HM'_{3\,mN}$) of the tube is plotted on a vertical axis of the coordinate graph, coordinate points representing the relationship between total porosity and Martens hardness of the laminated tube are located in a quadrangle that is bounded by four coordinate points, namely a (7.5, 0.25), b (8, 0.02), c (25, 0.33), and d (25, 0.03), on the graph.

10. The laminated tube according to claim 9, wherein an indentation depth of an indenter and the Martens hardness of the laminated tube measured in accordance with ISO14577 satisfy Equation (8), $$-0.0700/\mu m \leq (HM'_{3\,mN} - HM'_{2.5\,mN})/(D'_{3\,mN} - D'_{2.5\,mN}) \leq -0.0020/\mu m \qquad \text{Equation (8).}$$

11. The laminated tube according to claim 9, wherein an indentation depth of an indenter and the Martens hardness of the laminated tube measured in accordance with ISO14577 satisfy Equation (10), $$-0.0650/\mu m \leq (HM'_{3\,mN} - HM'_{25\,mN})/(D'_{3\,mN} - D'_{2.5\,mN}) \leq -0.0027/\mu m \qquad \text{Equation (10).}$$

12. The laminated tube according to claim 9, wherein an indentation depth of an indenter and the Martens hardness of the laminated tube measured in accordance with ISO14577 satisfy Equation (12), $$-0.0600/\mu m \leq (HM'_{3\,mN} - HM'_{2.5\,mN})/(D'_{3\,mN} - D'_{2.5\,mN}) \leq -0.0055/\mu m \qquad \text{Equation (12).}$$

\* \* \* \* \*